United States Patent
Schmitz et al.

(10) Patent No.: US 7,603,260 B2
(45) Date of Patent: Oct. 13, 2009

(54) OBJECT MODEL FOR INITIATING PHYSICAL OPERATIONS

(75) Inventors: Henning Schmitz, Heidelberg (DE); Thomas Friedrich, Walldorf (DE); Ami Heitner, Kfar-Sava (IL); Christoph Scheiber, Reilingen (DE)

(73) Assignee: SAP AG, Walldorf ( * ) Notice: Subject to any disclaimer, the term of this patent is extended or adjusted under 35 U.S.C. 154(b) by 539 days.

(21) Appl. No.: 11/321,198

(22) Filed: Dec. 29, 2005

(65) Prior Publication Data

US 2007/0162491 A1    Jul. 12, 2007

(51) Int. Cl.
G06F 17/50 (2006.01)
G05B 11/01 (2006.01)

(52) U.S. Cl. .............................. 703/2; 703/26; 700/19; 707/3

(58) Field of Classification Search .................... 703/2, 703/26; 700/19; 707/3
See application file for complete search history.

(56) References Cited

U.S. PATENT DOCUMENTS

| | | | | |
|---|---|---|---|---|
| 2005/0091576 A1* | 4/2005 | Relyea et al. | ............... | 715/502 |
| 2005/0138013 A1* | 6/2005 | Walker et al. | ............... | 707/3 |
| 2005/0223109 A1* | 10/2005 | Mamou et al. | ............... | 709/232 |
| 2006/0074498 A1* | 4/2006 | Kalan et al. | ............... | 700/19 |

OTHER PUBLICATIONS

'Adonix Geode GX' [online]. Adonix, 2006, [retrieved on Mar. 9, 2006]. Retrieved from the Internet: <URL:www.adonix.us/Adonix_Geode_GX. 189.0.html>.

'Advanta Software' [online]. Advanta Software, [retrieved on Mar. 9, 2006]. Retrieved from the Internet: <URL:www.advantasoftware.com.au/home.asp>.

'G.O.L.D. Stock: Integrating your logistics network in your supply chain' [online]. Aldata, [retrieved on Mar. 31, 2006]. Retrieved from the Internet: <URL: www.aldata-solution.fr/eng/products/brochure_stock_2005_en.pdf>.

'G.O.L.D. Pick: Picking zone optimisation' [online]. Aldata, [retrieved on Mar. 31, 2006]. Retrieved from the Internet: <URL: www.aldata-solution.fr/eng/new_and _events/G.O.L.D. %20Pick%20EN.pdf>.

'G.O.L.D. Business Solution: Voice in the warehouse' [online]. Aldata, [retrieved on Mar. 31, 2006]. Retrieved from the Internet: <URL www.aldata-solution.fr/eng/new_and_events/ G.O.L.D. %20Vocal%20EN.pdf>.

'G.O.L.D. Billing: Logistics services invoicing' [online]. Aldata, [retrieved on Mar. 31, 2006]. Retrieved from the Internet: <URL www.aldata- solution.fr/eng/new_and_events /G.O.L.D. %20Billing%20EN.pdf>.

(Continued)

*Primary Examiner*—Thai Phan
(74) *Attorney, Agent, or Firm*—Fish & Richardson P.C.

(57) ABSTRACT

A method to be performed in a process of a computer system initiating physical operations includes receiving, in a computer system, a request to generate a first object and a second object. The first object is to be used in initiating a manufacturing-type operation and the second object is to be used in initiating a warehouse-type operation. The method includes generating the first object and the second object in response to the request. The first and second objects are generated using an object model for physical operations. A computer system includes a first resource and a second resource, and an object generating module configured to generate the first and second objects.

18 Claims, 10 Drawing Sheets

Link between nodes from different node classes (material flow, scheduling, hierarchy)

OTHER PUBLICATIONS

'Enterprise-wide distribution software and solutions' [online]. Apprise Software, [retrieved on Mar. 9, 2006]. Retrieved from the Internet: <URL www.apprise.com>.

'Aquitec Solutions' [online]. Aquitec, 2004 [retrieved on Mar. 9, 2006]. Retrieved from the Internet: <URL www.aquitecintl.com/solutions/ewms.asp>.

CatalystCommand Warehouse Management [online]. Catalyst International, [retrieved on Mar. 9, 2006]. Retrieved from the Internet: <URL www.catalystinternational.com/content/solution_center/execution/warehousing/management.asp>.

'ClearOrbit' [online]. Clear Orbit, 2006 [retrieved on Mar. 9, 2006]. Retrieved from the Internet: <URL www.clearorbit.com/index.php?sess_id=ab8ee7ae2675c92981a0a13b398c9100>.

'SattStore WMS: Total control and optimization of your automated or manual DC' [online]. Consafe Logistics, 2006 [retrieved on Mar. 9, 2006]. Retrieved from the Internet: <URL www.consafelogistics.com/Warehouse%20Management%20Systems/Products/SattStoreWMS.aspx>.

'Astro WMS: Efficient real-time warehouse management' [online]. Consafe Logistics, 2006 [retrieved on Mar. 9, 2006]. Retrieved from the Internet: URLwww.consafelogistics.com/Warehouse%20Management %20Systems/Products/AstroWMS.aspx>.

'Effect Warehouse: Easily implemented, cost-effective and robust' [online]. Consafe Logistics, 2006 [retrieved on Mar. 9, 2006]. Retrieved from the Internet: <URL www.consafelogistics.com/Warehouse%20Management%20Systems/Products.Effect_Warehouse.aspx>.

'Daifuku Warehouse Rx WMS software' [online]. Daifuku Company, 1998-2005 [retrieved on Mar. 9, 2006]. Retrieved from the Internet: <URL www.daifukuglobal.com/daifuku/ global/products /f_wmssoftware_1.asp>.

'Supply chain execution' [online]. Epicor , [retrieved on Mar. 9, 2006]. Retrieved from the Internet: <URLwww.epicor.com/www/products/enterprise/scm/warehousing.htm>.

'Warehouse management—SCE' [online]. Fascor, 2005[retrieved on Mar. 9, 2006]. Retrieved from the Internet: <URL www.fascor.com/faswms05.htm>.

'Foxfire Technologies' [online]. Foxfire Technologies, [retrieved on Mar. 9, 2006]. Retrieved from the Internet: <URL: www.foxfiretechnologies.com>.

'FKI Logistix White Systems launches SpectrumPlus Warehouse Control System' [online]. FKI Logistix, 2000-2005 [retrieved on Mar. 9, 2006]. Retrieved from the Internet: <URL:www.fkilogistex.com/ media-center/press-releases/default.aspx?pid=181-2&k=spectrum%20plus&m=0&y=0>.

SmartEnterprise 2: An integrated software suite for comprehensive 3PL management [online]. Headwater Technology Solutions, [retrieved on Mar. 9, 2006]. Retrieved from the Internet: <URL: www.Headwaterinc.com/download/HW_SmartEnterprise.pdf>.

'HighJump Software: Your partner for long-term competitive advantage' [online]. HighJump Software, 2000-2006 [retrieved on Mar. 9, 2006]. Retrieved from the Internet: <URL:www.highjumpsoftware.com/SupplyChainAdvantage/Difference>.

'ICS Logimax' [online]. ICS, [retrieved on Mar. 9, 2006]. Retrieved from the Internet: <URL:www.e-logimax.com/downloads/lmx_overvew.pff>.

'Infor' [online]. Infor, 2006[retrieved on Mar. 9, 2006]. Retrieved from the Internet: <URL: www.infor.com>.

'INTEK: Warehouse librarian' [online]. INTEK Integration Technologies, 2004 [retrieved on Mar. 9, 2006]. Retrieved from the Internet: <URL: www.intek.com>.

'Irista Warehouse' [online]. Irista, 2006 [retrieved on Mar. 9, 2006]. Retrieved from the Internet: <URL: www.irista.com>.

'IRMS Warehouse management system' [online]. Integrated Warehouing Solutions (IWS), [retrieved on Mar. 9, 2006]. Retrieved from the Internet: <URL: www.irmswms.com/>.

'IntelliTrack Warehouse management system' [online]. IntelliTrack, 2005 [retrieved on Mar. 9, 2006]. Retrieved from the Internet: <URL: www.intellitrack.net/warehouse_management_system_wms.asp>.

'IntelliTrack slap and ship' [online]. IntelliTrack, [retrieved on Mar. 9, 2006]. Retrieved from the Internet: <URL: www.intellitrack.net/upgrades_downloads.asp ftp://ftp.intellitrack.net/DataSheets/Slap&Ship.pdf>.

'Logility Voyager WarehousePRO' [online]. Logility, 2006 [retrieved on Mar. 9, 2006]. Retrieved from the Internet: <URL: www.logility.com/solutions/warehousemgt.html>.

Manhattan associates: A complete set of supply chain solutions [online]. Manhattan Associates, [retrieved on Mar. 9, 2006]. Retrieved from the Internet: <URL: www.manh.com>.

'rf navigator EMMS' [online]. Majure Data, 2005 [retrieved on Mar. 9, 2006]. Retrieved from the Internet: <URL: www.majuredate.com>.

'Microlistics: ISIS Enterprise' [online]. Microlistics, 2002 [retrieved on Mar. 9, 2006]. Retrieved from the Internet: <URL: www.microlistics.com/micro/products/isisenterprise.jsp>.

'Microlistics: ISIS Express' [online]. Microlistics, 2002 [retrieved on Mar. 9, 2006]. Retrieved from Internet: <URL: www.microlistics.com/micro/products/isisexpress.jsp>.

'Microlistics: ISIS 3PL' [online]. Microlistics, 2002 [retrieved on Mar. 9, 2006]. Retrieved from the Internet: <URL: www.microlistics.com/micro/products/isisenterprise.jsp>.

'Navis' [online]. Navis, [retrieved on Mar. 9, 2006]. Retrieved from the Internet: <URL: www.navis.com/home.jsp>.

'Open Business Solutions: Calidus-e' [online]. Open Business Solutions, 2004 [retrieved on Mar. 9, 2006]. Retrieved from the Internet: <URL: www.openbusinessolutions.co.uk/index.html>.

'Oracle Corporation' [online]. Oracle, 2006 [retrieved on Mar. 9, 2006]. Retrieved from the Internet: <URL: www.oracle.com/index.html>.

'Provia: FourSite OMS' [online]. Provia, 2006 [retrieved on Mar. 9, 2006]. Retrieved from the Internet: <URL: www.provia.com/ProductSolutions/FourSiteOMS/default.htm?ave=WM>.

'Provia; ViaWare WMS' [online]. Provia, 2006 [retrieved on Mar. 9, 2006]. Retrieved from the Internet: <URL: www.provia.com/ProductSolutions/ViaWareWMS/default.htm?ave=WM>.

'PSI Logistics: PSIwms' [online]. PSI Logistics, 2005 [retrieved on Mar. 9, 2006]. Retrieved from the Internet: <URL: www.psilogistics.com/warehouse-management/en>.

'QSSI: Power House/WMS' [online]. QSSI, 1985-2005[retrieved on Mar. 9, 2006]. Retrieved from the Internet: <URL: www.qssi-wms.com/>.

'Radcliffe: ROC RFID' [online]. Radcliffe, 2005[retrieved on Mar. 9, 2006]. Retrieved from the Internet: <URL: www.radcliffeinc.com/cws/index.jsp?name=NVs9CB8B6w>.

Radio Beacon—Warehouse Management Software [online]. Radio Beacon, 2005 [retrieved on Mar. 10, 2006]. Retrieved from the Internet: <URL: www.radiobeacon.com/Solution/RadioBeaconWMS.aspx>.

'RedPrairie: Warehouse' [online]. RedPrairie, [retrieved on Mar. 10, 2006]. Retrieved from the Internet: <URL: www.redprairie.com/Warehouse%20Management/default/.aspx>.

Retalix: Triceps Warehouse Management [online]. Retalix, 2006[retrieved on Mar. 10, 2006]. Retrieved from the Internet: 21 URL: www.retalix.com/index.cfm?pageid=546>.

'Retalix: MDS Yard & Dock Control' [online]. Retalix, 2006[retrieved on Mar. 10, 2006]. Retrieved from the Internet: <URL: www.retalix.com/index.cfm?pageid=550>.

'Robocom: Warehouse Management Solutions' [online]. Robocom, 2004[retrieved on Mar. 10, 2006]. Retrieved from the Internet: <URL: www.robocom.com/>.

'RT Systems: RT Locator' [online]. RT Systems, 2005[retrieved on Mar. 10, 2006]. Retrieved from the Internet: <URL: www.t-systems.com/>.

'Connecting a Fully Automated Warehouse' [online]. SAP, [retrieved on Mar. 6, 2006]. Retrieved from the Internet: <URL: //help.sap.com/saphelp_nw04/helpdata/en/52/16ab2e543311d 1891c0000e8322f96/cont>.

'Connecting a Semi-Automated Warehouse' [online]. SAP, [retrieved on Mar. 6, 2006]. Retrieved from the Internet: <URL:help.sap.com/saphelp_nw04/helpdata/en/52/16ab21543311d 1891c0000e8322f96/cont>.

Scenarios for connecting external systems [online]. SAP, [retrieved on Mar. 6, 2006]. Retrieved from the Internet: < URL: http://help.sap.com/saphelp_nw04/helpdata/en/52/16aafa543311d1891c0000e8332f96/conte>.

'SAP: mySAP Supply Chain Management' [online]. SAP, [retrieved on Mar. 10, 2006]. Retrieved from the Internet: <URL: www.sap.com/usa/solutions/business-suite/scm/pdf/BWP_WM_LES.pdf>.

'Savant Software: Shipping Manifest Systems' [online]. Savant Software, 2006[retrieved on Mar. 10, 2006]. Retrieved from the Internet: <URL: www.savantwms.com/main.asp?sec=solutions>.

'Scenic Technology: On demand warehouse management software' [online]. Scenic Technology, [retrieved on Mar. 10, 2006]. Retrieved from the Internet: <URL: www.scenictechnology.com/>.

'Siemens Logistics & Assembly: Dematic' [online]. Seimens Logistics & Assembly, 2006 [retrieved on Mar. 10, 2006]. Retrieved from the Internet: <URL: www.logistics-assembly.siemens.com/docs/stc_corp_home_fl.asp?id=23385&sp=E&m1=23384&m2=23385&m3=&domid=1029&zfz=2004930-33982-47>.

'SSA Global: SSA ERP' [online]. SSA Global, [retrieved on Mar. 10, 2006]. Retrieved from the Internet: <URL: www.ssaglobal.com/documents/ssa_erp_1x_release.doc>.

'Sterling Commerce: Network Warehouse Management System' [online]. Sterling Commerce, 2006[retrieved on Mar. 10, 2006]. Retrieved from the Internet: <URL: www.sterlingcommerce.com/About/News/WarehouseManagementReport.htm>.

'Swisslog: Warehouse manager' [online]. Swisslog, 2004[retrieved on Mar. 10, 2006]. Retrieved from the Internet: <URL: www.swisslog.com.wds-index/wds-sw/wds-sw-wm.htm>.

'Swisslog: Automation Manager' [online]. Swisslog, 2004[retrieved on Mar. 10, 2006]. Retrieved from the Internet: <URL: www, http://www.swisslog.com/wds-index/wds-sw/wds-sw-am.htm>.

'Tecsys: Warehouse Management Software' [online]. Tecsys, [retrieved on Mar. 10, 2006]. Retrieved from the Internet: <URL: www.tecsys.com/products/wms.shtml>.

'Tecsys: Pointforce Distribution Management System' [online]. Tecsys, [retrieved on Mar. 10, 2006]. Retrieved from the Internet: <URL: www.tecsys.com/products/dms/capabilities.shtml>.

'Wolin Design Group: da Vinci Supply Chain Business Suite/ Icon WMS' [online]. Wolin Design Group, 2004 [retrieved on Mar. 10, 2006]. Retrieved from the Internet: <URL: www.wdgcorp.com/>.

"E71-MTO Order Processing", *mySAP_All-in-One*, Release V3.46C, Jul. 2003.

* cited by examiner

FIG. 7 Link between nodes from different node classes (material flow, scheduling, hierarchy)

OBJECT MODEL FOR INITIATING PHYSICAL OPERATIONS

TECHNICAL FIELD

The description relates to a model for objects that can be used in initiating physical operations.

BACKGROUND

There exists systems for computerized automation of operations and processes in industrial or other commercial enterprises. Examples of such existing systems are those available from SAP AG in Walldorf (Baden) Germany. Some of the existing systems are intended for use with the logistic procedures and operations that are common in manufacturing processes and they are therefore typically used in production plants. Other systems, or components of systems, are intended for use in the logistic management of products that have already been manufactured. They are therefore typically used in warehouses, distribution centers and other facilities where goods may be inspected, repacked and moved to particular storage locations while awaiting shipment.

The distribution of responsibilities and functionality between these two categories of systems is based on the way that these industries have emerged and developed historically. That is, over decades in the past, production plants and similar facilities have carried out their operations according to well-established routines that involve the basic steps of making the product. Improvements in technology have changed the way certain tasks are performed, but the general logistic view of how the core constituents of the manufacturing process is carried out has not changed as significantly. Similarly, warehouses have traditionally been viewed as facilities mainly for logistic management of goods without significant modification and, thus, essentially non-manufacturing in nature.

This view is reflected in the existing systems for controlling manufacturing processes. The computer model they use for the different components of the process are typically specialized and heavily flavored by the traditional manufacturing view. Systems for warehouse management, in contrast, have other computer models that are targeted toward managing the logistics of storing and eventually delivering goods. A disadvantage of existing systems, then, is that they are designed and configured for only their type of process and lack flexibility in adapting to new demands in the industry and the marketplace that challenge the traditional views.

SUMMARY

The invention relates to an object model for initiating physical operations.

In a first general aspect, a method to be performed in a process of a computer system initiating physical operations includes receiving, in a computer system, a request to generate a first object and a second object. The first object is to be used in initiating a manufacturing-type operation and the second object is to be used in initiating a warehouse-type operation. The method includes generating the first object and the second object in response to the request. The first and second objects are generated using an object model for physical operations.

Implementations may include any or all of the following features. The method may further include generating a step object for at least one of the first and second objects, the step object representing performance of a step in the associated operation. The method may further include aggregating the first and second objects into an operation object. The aggregation may be done by assembling the first and second objects under a hierarchy node in the object model. The hierarchy node may be selected from among several hierarchy nodes in the object model based on a type of the hierarchy node. The manufacturing-type operation may be designed to transform a material of a product, and the warehouse-type operation may be (1) designed to physically move a product, or (2) designed to physically pack the product. The method may further include defining an input for at least one of the first and second objects, the input specifying a condition for initiating the associated operation. The method may further include defining an output for at least one of the first and second objects, the output specifying a result of performing the associated operation. The method may further include initiating the manufacturing-type operation using the first object and initiating the warehouse-type operation using the second object. The method may further include generating an electronic view for at least one of the first and second objects, the electronic view being defined by the object model. The electronic view may represents a material flow regarding the manufacturing-type operation or the warehouse-type operation. The electronic view may represent a scheduling regarding the manufacturing-type operation or the warehouse-type operation. The electronic view may represent a description of the manufacturing-type operation or the warehouse-type operation.

In a second general aspect, a computer system includes a first resource and a second resource. The first resource is configured to perform a manufacturing-type operation with regard to a product. The second resource is configured to perform a warehouse-type operation with regard to the product. The computer system further includes an object generating module configured to generate a first object to be used in initiating the manufacturing-type operation and a second object to be used in initiating the warehouse-type operation. The first and second objects are generated using an object model for physical operations.

Implementations may include any or all of the following features. The object generating module may further be configured to generate a step object for at least one of the first and second objects, the step object representing performance of a step in the associated operation. The object generating module may further be configured to generate an electronic view for at least one of the first and second objects, the electronic view being defined by the object model. The electronic view may represent a material flow regarding the manufacturing-type operation or the warehouse-type operation. The electronic view may represent a scheduling regarding the manufacturing-type operation or the warehouse-type operation. The electronic view may represent a description of the manufacturing-type operation or the warehouse-type operation.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

Like reference numerals in the various drawings indicate like elements.

DETAILED DESCRIPTION

Figure 1:
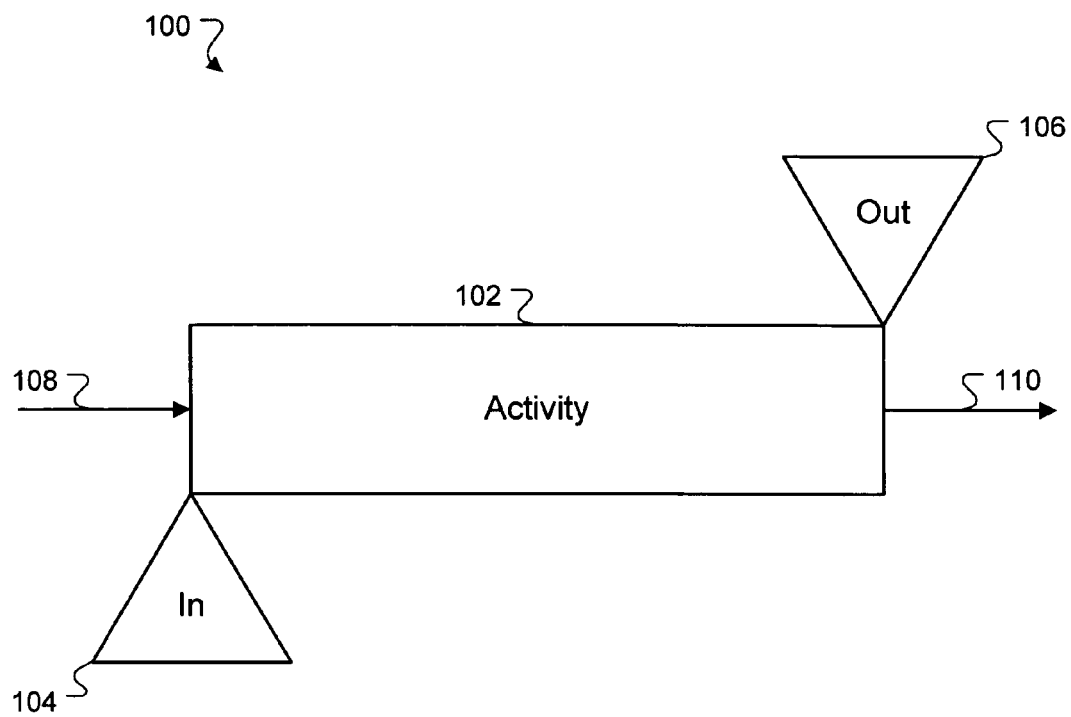
FIG. 1 shows a block diagram of an exemplary activity object that can be used in computer-planned and initiated operations.

FIG. 1 shows an activity object 100 for computer-planned and initiated operations. An activity object 100 may be used for processes that include, but are not limited to, operations to move, make, maintain, check and pack products or other items. These operations can be performed in various locations where, for example, products are produced and services are performed, such as manufacturing plants and warehouses.

One or more activities 102 are defined for the operation. The activity 102 contains the information needed to perform an action in the execution of an operation. Examples of activities include, but are not limited to, setup, produce and pack.

The activity 102 may have certain requirements in order to perform its action in the execution of an operation. Such a requirement depends on the operation to be performed as well as the type of process to be executed. For example, the activity 102 may involve taking a required material needed in the manufacture of a product from a bin or to move a completed product from the assembly line to the packaging line. In these examples, it is required that the material or the product are in their respective locations before the activity is performed.

An input 104 is therefore defined as a pre-condition for the activity 102. Included with the input 104 may be information needed by the activity 102 in order to use the input 104 in its process, for example any of the categories just mentioned.

An output 106 is defined as a result of the activity 102. As in the example above, the output of the move activity is the placement of the completed product on the packaging line.

The activity 102 may be associated with relations to other activities. An input activity relation 108 is a description of a sequence in which the activity 102 is performed. An output activity relation 110 is a description of a sequence that can be used as an input activity relation for the next activity. The input activity relation 108 indicates the link from a previous activity to the activity 102. Similarly, the output activity relation 110 indicates the link from the activity 102 to a subsequent activity. The input activity relation 108 and the output activity relation 110 allow for relational information to be passed from one activity to another enabling their connectivity. For example, the input activity relation 108 may define that the activity 102 can be initiated immediately upon finishing the previous activity, or that there must be a predefined cooling period between finishing the previous activity and beginning the activity 102.

Figure 2A:
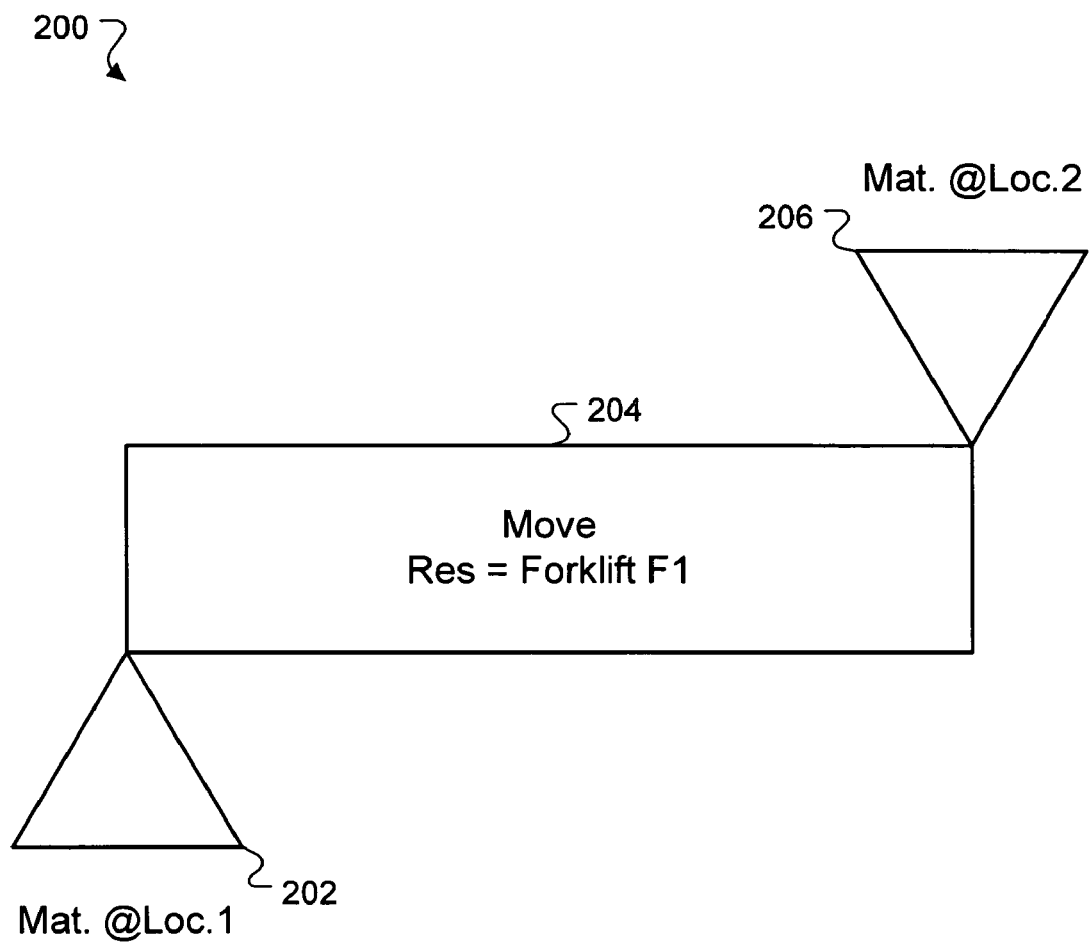
FIG. 2A shows a block diagram using the activity object of FIG. 1 for an exemplary move operation.
Figure 2B:
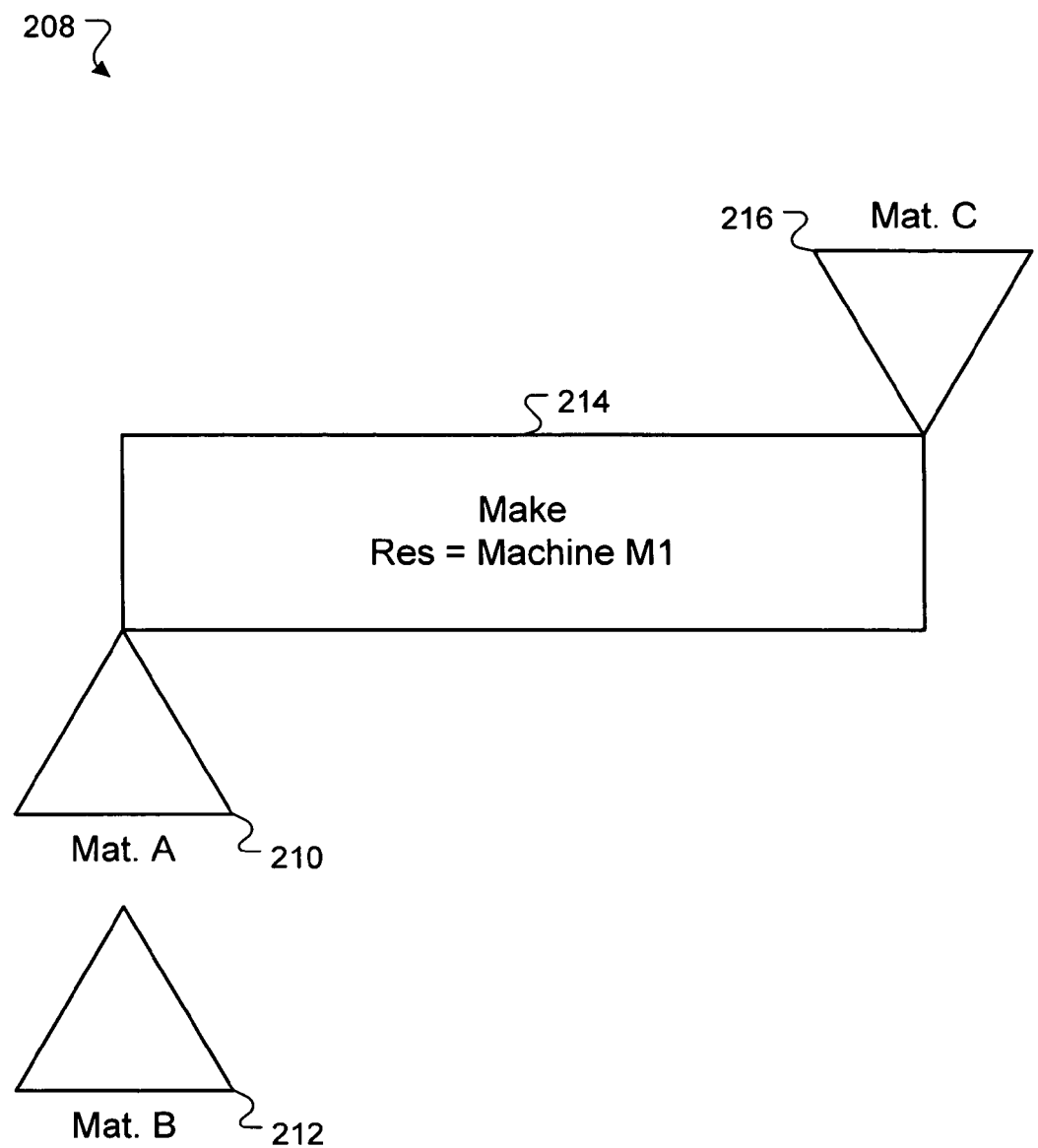
FIG. 2B shows a block diagram using the activity object of FIG. 1 for an exemplary make operation.

FIGS. 2A and 2B show examples of activity objects that can be used for specific operations. First, FIG. 2A is an example of a move activity that involves moving a material from a Location 1 to a Location 2. A move activity object 200 includes an input 202 which is, in this example, a raw material at Location 1. The activity for this operation is a move activity 204. This activity includes moving the raw material from Location 1 to Location 2 using a forklift F1 as a resource. The activity includes an output 206 that represents the raw material being present at Location 2.

Second, FIG. 2B is an example of a make activity that involves the mixing of two materials, Material A and Material B, to a new material, Material C. A make activity object 208 includes an input 210 of Material A and another input 212 of Material B. The activity for this operation is a make activity 214. The action for this activity is the mixing of material A and material B using a machine M1 as a resource. The make activity 214 includes an output 216 of Material C which is the result of mixing Material A and Material B.

Figure 3A:
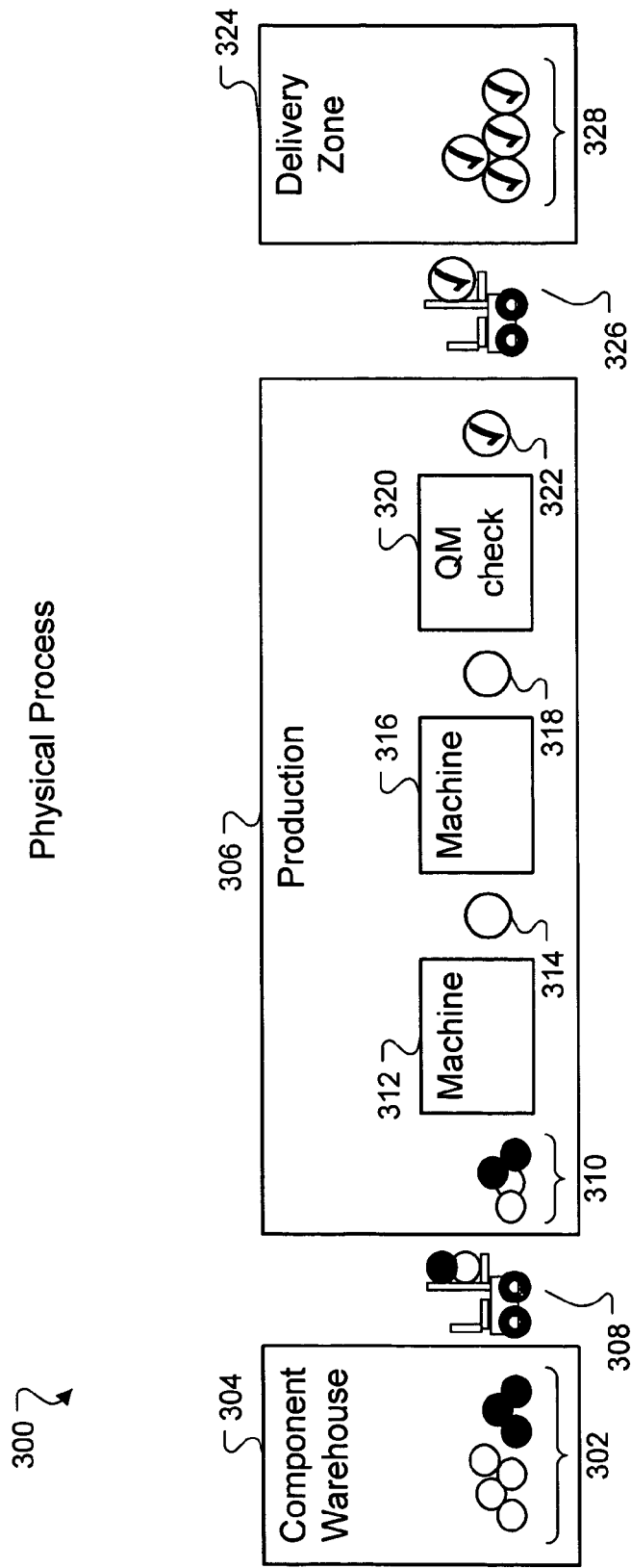
FIG. 3A shows a diagram of an exemplary physical process including make, move and check operations.
Figure 3B:
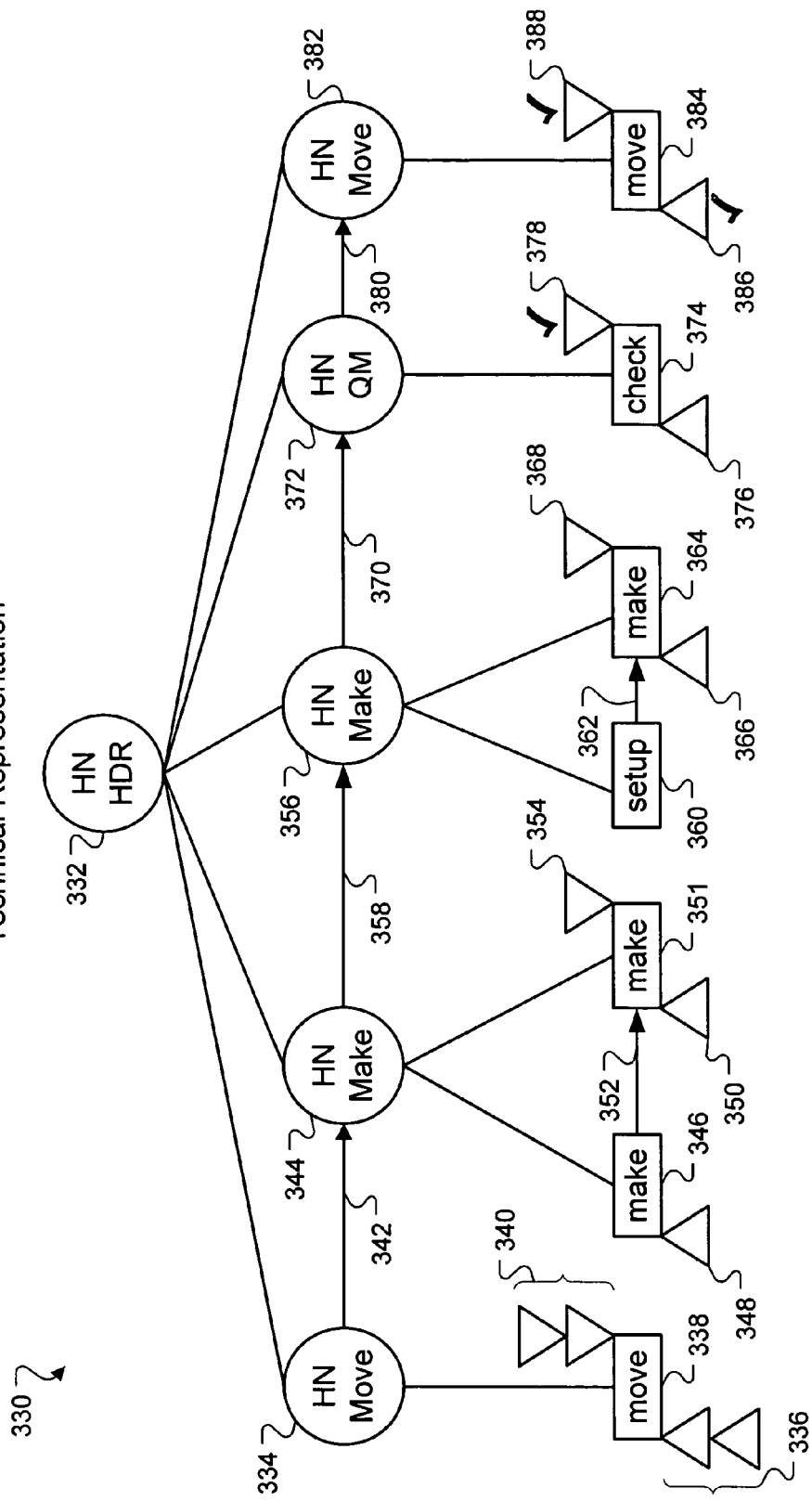
FIG. 3B shows a hierarchical chart of a technical representation of the exemplary physical process shown in FIG. 3A.

FIG. 3A shows a physical process 300 performed for an exemplary product order. FIG. 3B shows a technical representation 330 of the physical process of FIG. 3A that uses execution objects in performing the operations.

The physical process 300 uses at least two different raw materials 302 stored in a component warehouse 304. These raw materials 302 are to be used in the manufacturing of a product in a production facility 306. The raw materials 302 are physically moved from the component warehouse 304 to the production location 306 using a resource 308, for example a forklift. The raw materials 302 are placed at a raw materials receiving area 310. From the raw materials receiving area 310 the raw materials are provided to a machine 312 used in the manufacture of the product. The machine 312 produces an intermediate product 314 using the raw materials 302. The intermediate product 314 is used by a machine 316 that, in this example, produces a finished product 318. The finished product 318 is then put through a Quality Management (QM) check 320. If the finished product 318 fails the QM check 320 it can be discarded at this point or be sent back for additional processing. If the finished product 318 passes the QM check 320, it is then considered an approved product 322. The approved product 322 is then physically moved to a delivery zone 324 using a resource 326, for example, a forklift. This move may be between areas within a physical plant or between separate plants. The approved product 322 is placed in a final product receiving area 328 where it may be placed in inventory for later shipment to a customer.

In FIG. 3B, the technical representation 330 uses hierarchical nodes (HN) as generic structuring elements within a framework. The framework consists of a building of hierarchy nodes that may have one or more activity objects associated with them. Particularly, the hierarchical nodes can be used with both production-type operations and warehouse-type operations. A hierarchy node header (HN HDR) 332 represents the product order.

A HN Move node 334 represents the moving of the raw materials 302 from the component warehouse 304 to the production facility 306. An activity 338 is associated with the HN Move node 334. The activity 338 takes inputs 336, which are the two different raw materials 302, and performs a move operation. This results in outputs 340, which correspond to the two different raw materials 302 being placed into the raw material receiving area 310. The move operation uses the resource 308, which in the example is a forklift. A network 342 connects the HN Move node 334 to a HN make node 344, which is the next execution node in the order process.

The HN Make node 344 represents the operation of the machine 312. The node has two activity nodes associated with it. An activity 346 performs a make operation using an input 348. The activity 346 corresponds to a first portion of the operation performed by the machine 312. For example, the activity 346 is performed on the white material of the raw materials 302. After the activity 346 there follows an input 350 into an activity 351 which corresponds to a second portion of the operation performed by the machine 312. For example, the activity 351 involves adding the black material of the raw materials 302 to the processed white material. An activity relation 352 indicates that the activity 346 is performed before the activity 351. The activity 351 performs a make operation using the input 350 to produce an output 354, which represents the intermediate product 314. An HN Make node 356 represents the operation performed by the machine 316. The HN make node 356 and the HN Make node 344 together represent the physical manufacturing process for the product as shown by the network 358.

The HN Make node 356 has associated with it two activity objects. An activity 360 is a setup operation, for example to set up the machine 316. An activity relation 362 indicates that the activity 360 is performed before an activity 364. The activity 364 is a make operation using input 366, which is the intermediate product 314 and resulting in output 368, which is the finished product 318. A network 370 shows that a HN QM node 372 is the next execution node in the order process.

The HN QM node 372 represents the QM check 320 of the physical process. The node has associated with it an activity 374 to perform a check operation on an input 376, which is the finished product 318, and to produce an output 378, which is the approved product 322. A network 380 shows that a HN Move node 382 is the next execution node in the order process.

The HN Move node 382 represents the movement of the approved product 322 from the production location 306 to the delivery zone 324. The node has associated with it an activity 384 to place the approved product 322 in a specific location. It does this by performing a move operation using a resource 326. An input 386 is the approved product 322 in the production location 306 and an output 388 is the approved product in the delivery zone 324.

Figure 4:
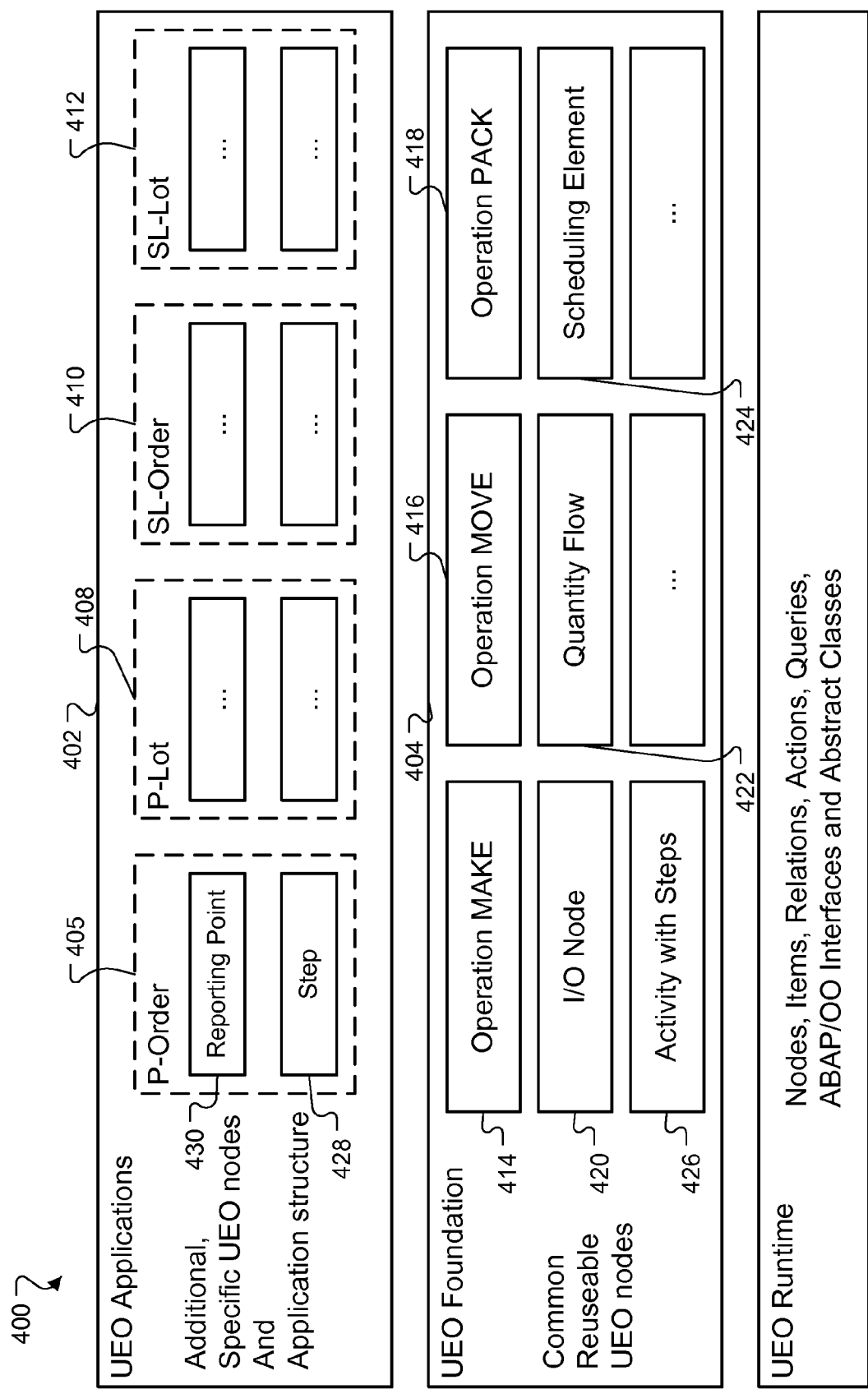
FIG. 4 shows a block diagram of an exemplary architecture.

FIG. 4 shows an exemplary architecture that can use common execution objects and that is here referred to as a Unified Execution Order (UEO) 400. The UEO architecture has three layers: a UEO application layer 402, a UEO foundation layer 404, and a UEO runtime layer 406. These layers provide a framework for order-like applications in the logistics area, especially site logistics (SL), for example a warehouse, and production (P), for example a manufacturing plant.

The UEO application layer 402 includes one or more production orders, here P-Order 405, one or more production lots, here P-Lot 408, one or more site logistic orders, here SL-Order 410 and one or more site logistic lots, here SL-Lot 412. An order is an object that is used to model and describe a process down to the execution level. The order also defines one or more resources to be used in performing the process. A lot is an object that is used to execute a process. The lot collects data for the process and may document its progress.

Abstract interfaces and nodes as well as several controller-like objects together form the UEO runtime layer 406. The UEO runtime layer 406 may also include relations, actions and queries. Here, the UEO runtime layer 406 also includes Advanced Business Application Programming/Object Oriented interfaces (ABAP/OO interfaces) which is a coding that may be used for implementing business logic within the UEO framework.

The UEO runtime layer 406 provides a generic basis for various standard building blocks, which are UEO nodes and UEO actions that are present in the UEO foundation layer 404. Based on the runtime there are several specific nodes classes provided. Examples of common reusable UEO nodes include operations that provide a process description.

Here, the UEO foundation layer 404 includes operation MAKE 414 where, for example, a product is fabricated from input raw materials. The layer 404 also includes operation MOVE 416 where, for example, a raw material is moved from a warehouse to a production location and operation PACK 418 where, for example, a product is placed in a box for shipment to a customer. Other example common reusable UEO nodes may be used to model and control material flow. Examples of these are I/O node 420 and quantity flow 422. Another example involves scheduling data using a scheduling element 424. Another common reusable UEO node may be an activity with steps 426 which may be a step-by-step description of how to perform a particular activity. Different UEO applications can use any or all of the example node types, as well as others.

The node types are not limited to use by the specific applications mentioned here but can be reused in other applications. As simple building blocks, the common reusable UEO nodes can be combined with application specific requirements and application specific logic to perform the necessary application processes. This can help to unify the implementation of application components.

The additional specific UEO nodes and application structure is shown in the UEO applications layer 402. The structure may include, but is not limited to, the four applications shown. The P-Order 405 and P-Lot 408 applications may be used in the production of a product, for example. The P-Order 405 can contain the execution instructions for the manufacture of a product. The product order object is extensible in a way that each application can provide additional application specific node types. This is shown, for example, by the introduction in the P-Order 405 of node type step 428 and node type reporting point 430, being used only by the P-Order 405 together with UEO foundation layer 404 node types. The introduction of application specific node types can be done in each application, if desired.

The P-Lot 408 collects the information about the execution of the activities of the P-Order 405. This information can be used, for example, to confirm production steps, or in inventory management or for cost calculations. For example, the P-Lot can show that an activity that was planned to be performed once had to be performed twice before the desired outcome was achieved.

Figure 5:
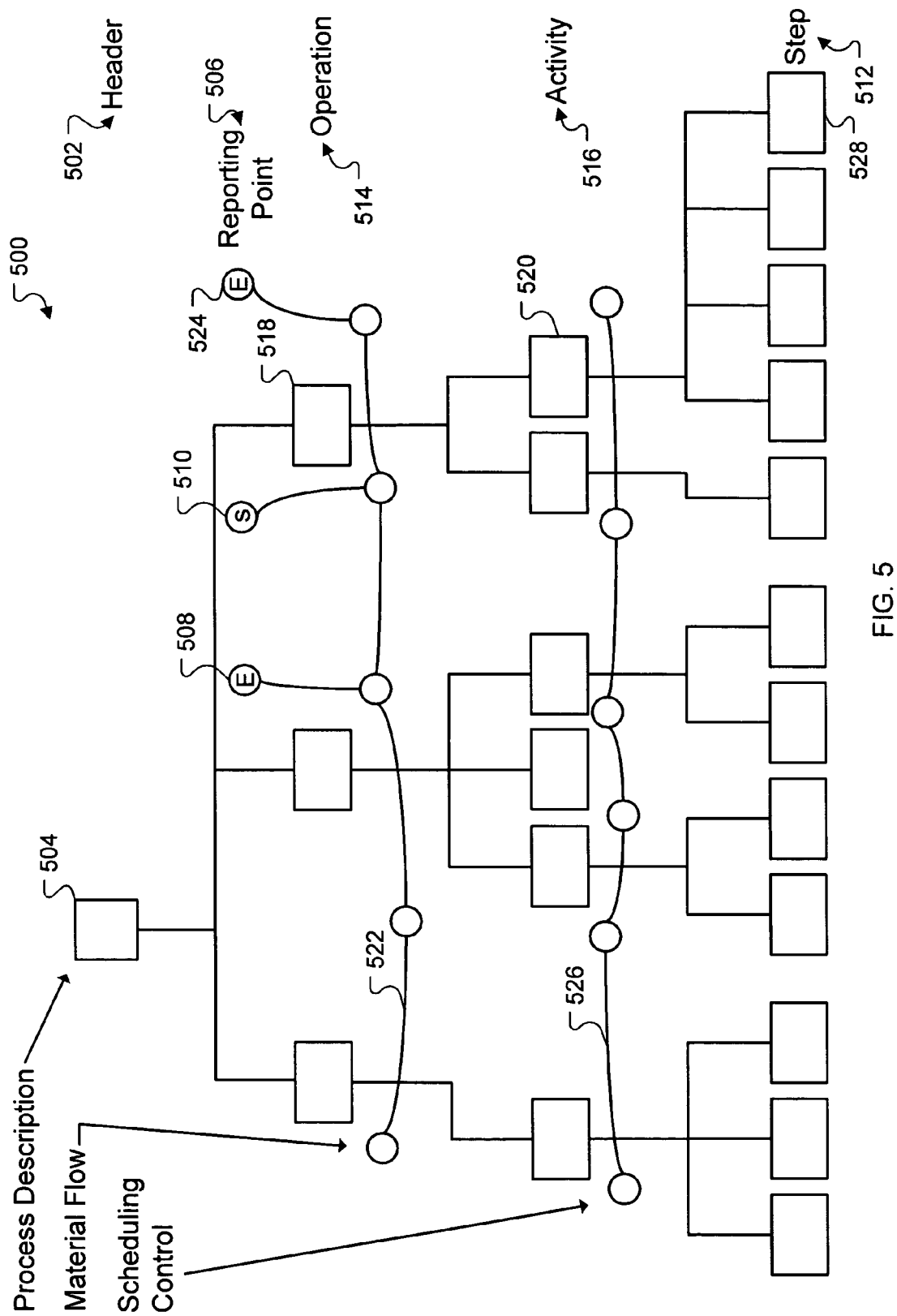
FIG. 5 shows an overview of an exemplary production order structure.

FIG. 5 shows an overview of an exemplary object structure 500. The structure 500 shows how a production order or a site logistics order can be modeled using nodes, shown as boxes in the figure, and relations, shown as connecting lines in the figure. The nodes may be included in the UEO application layer 402 or in the UEO foundation layer 404, and the relations may be contained in the UEO runtime layer 406.

The exemplary production order includes five nodes types, three of which are application specific. One of the application specific node types is a header 502 which contains a process description node 504. This node, for example, contains the data needed to manufacture the product. The reporting point node type 506 is another application specific node type where process progress is reported. The reporting point node type 506 includes quantity nodes which can be an end quantity node 508 or a start quantity node 510. The third application specific node type is a step 512 which can define a specific action needed in the manufacturing process. These node types may be included in the P-Order 405 and in the P-Lot 408, for example. The application-specific nodes may include parts that are covered by the general object model.

The exemplary production order also uses two common reusable UEO node types: the operation node type 514 and the activity node type 516. The operation node type 514 contains one or more operation nodes 518 such as operation MOVE 416 or operation PACK 418 as described above. The operation node type 514 contains one or more activity nodes 520 such as an activity with steps 426 as described above.

Material flow nodes 522 are assigned to the operation node type 514 of the process description 504 and represent the movement of materials from one operation node 518 to another. In the case of a production order as in this example, the material flow nodes are transformation nodes assigned to an operation. They represent the intermediate product stages of the manufacturing process. Quantity nodes are assigned to a reporting point node type 506 where the quantity of the manufactured product at its current state can be reported. The start quantity node 510 may be the input to an operation node 518 which is part of a work-in-progress (WIP). The end quantity node 508 may represent the product quantity between WIP operations. The end quantity node 524 may represent the final product quantity from the manufacturing process. These nodes may be included in the UEO foundation level 404 and can be used by production orders and by site logistic orders, to name two examples. For example, the material flow nodes 522 can be used in generating a view of the process to a user. The view may include material flow information and can be output on a display device.

The scheduling control 526 is assigned to the activity level 516. The scheduling control nodes are used, for example in a production order, for adding date and time information to the order. This information may be used to schedule an activity or to coordinate the sequencing in time between two activities. These nodes are also part of the UEO foundation level 404 and are reusable by other UEO applications. For example, the scheduling control 526 can be used in generating a view of the process to a user. The view may include scheduling information and can be output on a display device.

Figure 6:
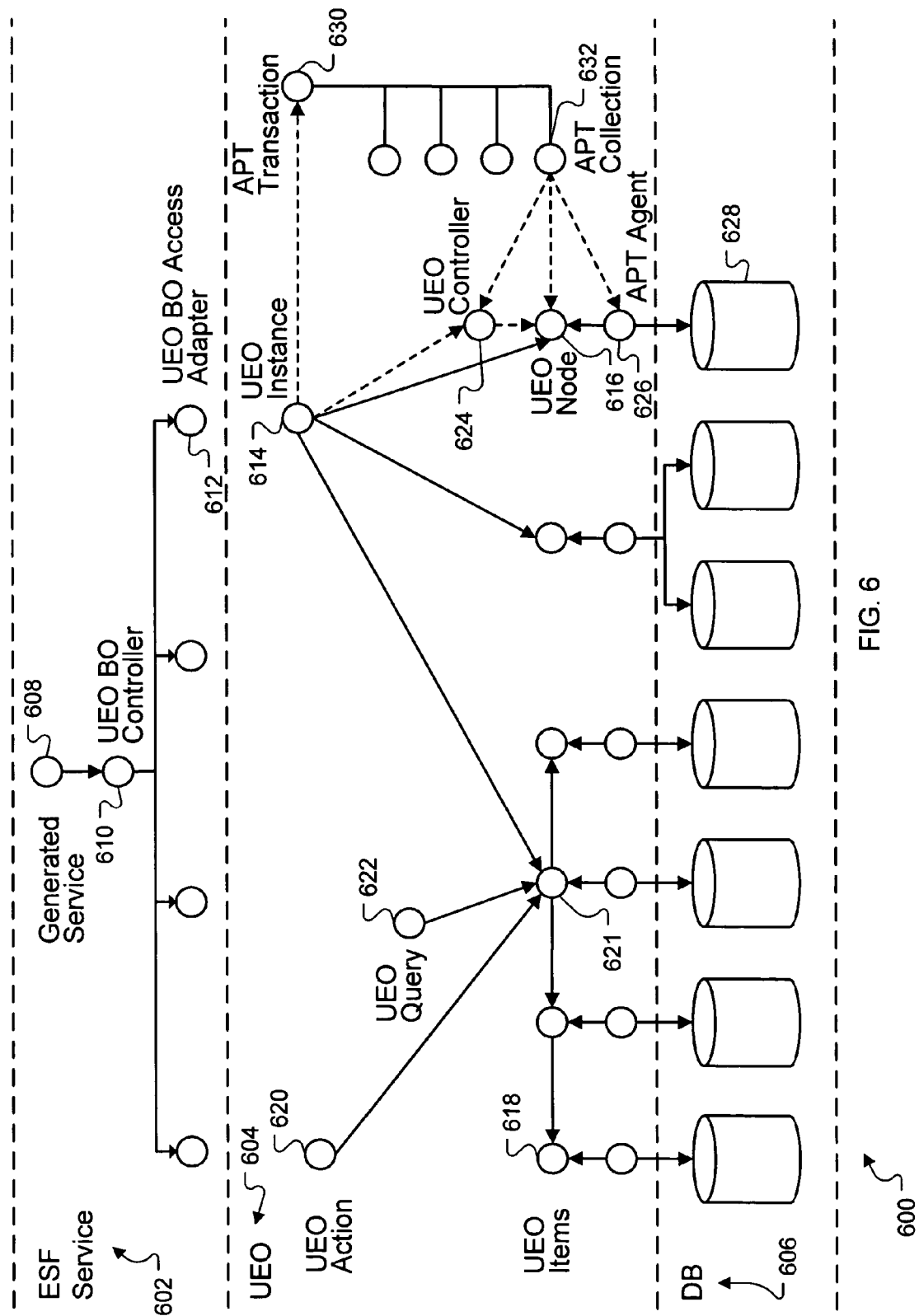
FIG. 6 shows an overview-level process flow chart of an exemplary method utilizing computer-planned and initiated operations.

FIG. 6 is an overview-level process flow chart 600. These operations are separated into three areas: an enterprise service framework (ESF) service 602, a UEO application 604 and a data buffer (DB) 606. The ESF service 602 provides a generated service 608 associated with a service provider. This generated service 608 is the entry point to the UEO application 604. The UEO application 604 provides business object (BO) independent node types, relation types, actions and queries allowing it to run underneath different business objects within the ESF service 602. A production order or a site logistics order are examples of business objects. The UEO application 604, therefore, introduces a mapping between the entities of the business objects within the ESF service 602 and the UEO application 604.

One UEO BO controller instance 610 is provided to the ESF service 602 from the UEO application 604. This UEO BO controller instance 610 is related to one registered UEO application, for example a production order. The service provider dispatches all calls it receives from the ESF service 602 to the UEO BO controller instance 610. The UEO application 604 also provides to the ESF service 602 a UEO BO access adapter class 612 for each implementation of a given UEO interface. These UEO application-specific adapter classes are responsible for mapping BO-specific global data types and the names of BO nodes, relations, actions and queries to a corresponding UEO instance.

One UEO BO access adapter class 612 is allowed to access multiple UEO nodes 616 or UEO items 618 depending on the specific ESF request and the application-specific UEO node model, examples of which were described in FIG. 5. On top of UEO items 618 the UEO application 604 allows the instantiation and execution of a UEO action 620. Examples of UEO actions are semantic checks or re-calculations along the material flow path, an example of which was shown in FIG. 5. The UEO action 620 is associated with a UEO node 621 which in this example is structured by three UEO items 618. The UEO application 604 also allows the instantiation and execution of a UEO query 622. The result of the execution of the UEO query 622 may be a table of globally unique identifiers and a node type, for example as described in FIG. 5.

The lifecycle of the UEO node 616 is controlled by a UEO controller 624 whose classes are implemented together with the UEO node classes. The UEO application 604 at runtime can access the registered UEO controllers using code that may be customer-specific, for example using a filter-based Business Add-In Builder as available in products from SAP AG in Walldorf (Baden), Germany.

The UEO nodes 616 and UEO items 618 are central instances that belong to different classes. They behave like persistent instances in terms of the used persistency control service APT (Agent, Persistent, and Transaction). Each persistent class is related to one stateless agent class that uses an APT Agent 626 to map the persistent instance attributes of the UEO node 616 to corresponding database table fields 628 within the DB 606. This may be done without a global data buffer based on internal tables. The node instances themselves are building the transactional buffer and an APT transaction 630 controls the transactional state of the DB 606.

Each controller behaves like a UEO controller 624 by implementing one given interface in order to provide access to specific UEO node instances. The controller also behaves like an APT controller in order to handle nodes as persistent instances that are collected in one controller-related APT collection 630.

The above described process flow may be implemented based on object oriented interfaces to implement the business logic needed within the UEO framework, for example using the ABAP programming language. The UEO nodes and optional UEO node items may be central instances in the interface.

Figure 7:
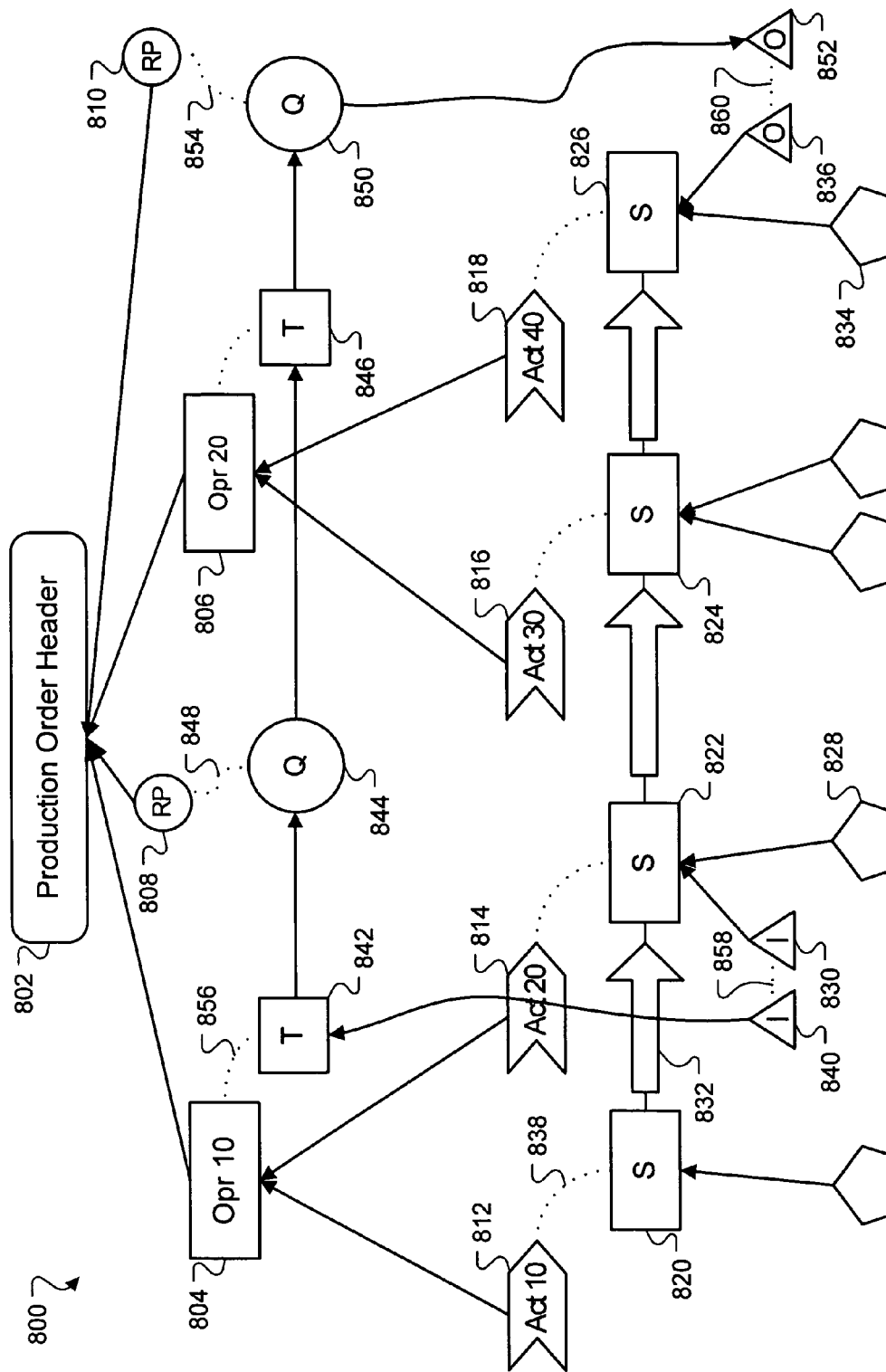
FIG. 7 shows an overview-level flow chart showing a process for an exemplary production order.

FIG. 7 shows an example of a complete production order 800. Each of the entities in the production order 800 may be a UEO node defined in either the UEO foundation layer 404 or the UEO application layer 402 as described in FIG. 4. The relations between the UEO nodes are defined by the production order and may be managed by the UEO at runtime, as shown in FIG. 6.

The production order header node 802 contains the data needed by the production order as well as the process description. In the production order hierarchy, many operations can be associated with the production order header node 802. In this example there is a first node 804 for a first operation and a second node 806 for a second operation which can be of any of the types previously defined. Also associated with the production order header node 802 are reporting point nodes. This example has two reporting point nodes, RP 808 and RP 810. Next in the production order hierarchy, below operations, are activity nodes. This example shows four activity nodes 812, 814, 816 and 818. Examples of the header node, the operation nodes, the reporting point nodes and the activity nodes were described in FIG. 5. The production order header node 802, the reporting point nodes, the operation nodes and the activity nodes all belong to the hierarchy class for the production order.

Another class in the production order is the scheduling class which contains scheduling element nodes, in this example, nodes 820, 822, 824 and 826. In this example, a scheduling element node is assigned to each activity node and is used for adding scheduling information to order entities (or groups of entities). It describes a time interval according to its start and end timestamps. Each scheduling element node has associated with it one or more resource requirements, for example resource requirement node 828. The resource requirement node 828 denotes a capacity requirement on a certain resource and refers to a scheduling element node, in this example scheduling element node 822.

The scheduling element node 822 also has associated with it an input node 830 that stores time information and represents the time stamp element used in scheduling control by the scheduling element node 822. A scheduling relation node 832 connects two scheduling elements, denoted as a source scheduling element 820 and a target scheduling element 822. The type of the scheduling relation can have the values ES (end-start), SS (start-start) or EE (end-end). The scheduling element node 826 has associated with it a resource requirement node 834 and an output node 836. The output node 836 stores time information and represents the time stamp element result of the scheduling control used by the scheduling element node 826. The resource requirements, the scheduling elements, the scheduling relations and the input node 830 and the output node 836 are all in the scheduling node class. A link may be provided between this class and the hierarchy class. For example, a link can be provided between a scheduling element and an activity. This link would provide scheduling information to the activity to ensure the resources and raw materials needed for that activity be made available prior to the start of the activity. An example of this is a link 838 between activity node 812 and scheduling element node 820.

The material flow class consists of input nodes, transformation nodes, quantity nodes and output nodes. An input node 840 represents materials and handling units entering the processing of an order. A handling unit is a physical item consisting of packaging materials and the products they contain. A transformation node 842 describes the transformation of several input or quantity nodes into several other output or quantity nodes. The transformation node 842 specifies proportions between the ingoing and outgoing quantities. For example, in production the standard rule is that all ingoing and outgoing quantities are proportional to the master output of the order.

A quantity node 844 is both an output of a previous step, in this example transformation node 842, and an input of a proceeding step, in this example transformation node 846. It models intermediate materials and handling units that stay in the process. It also represents the reporting point quantity, as shown by a link 848 between the quantity node 844 and the reporting point node 808. For example, at the reporting point all material quantities are captured and reported to the production order header node 802. A quantity node is used in the intermediate places in the material flow where items are counted. As an example, "in-transit" stock is modeled with a quantity node. A quantity node may also be used at the end of the production order process to count finished goods and deliver them as the order output. This is shown by a quantity node 850 associated with an output node 852 linked to the reporting point node 810 by link 854. The reporting point node 810 then reports the results to the production order header node 802.

Linking a transformation node to an operation is another way of linking the material flow class and the hierarchy class. For example, operation node 804 can be linked to the transformation node 842 by link 856. The operation node can provide the operation needed by the process used to perform the product transformation within the transformation node 842.

The material flow class can also be linked to the scheduling class. For example, the input 840 can be linked to the input 830 by link 858. This can provide timestamp information about the availability of the input 840. The output 852 can be linked to the output 836 by link 860 to provide timestamp information about the availability of the output product.

Figure 8:
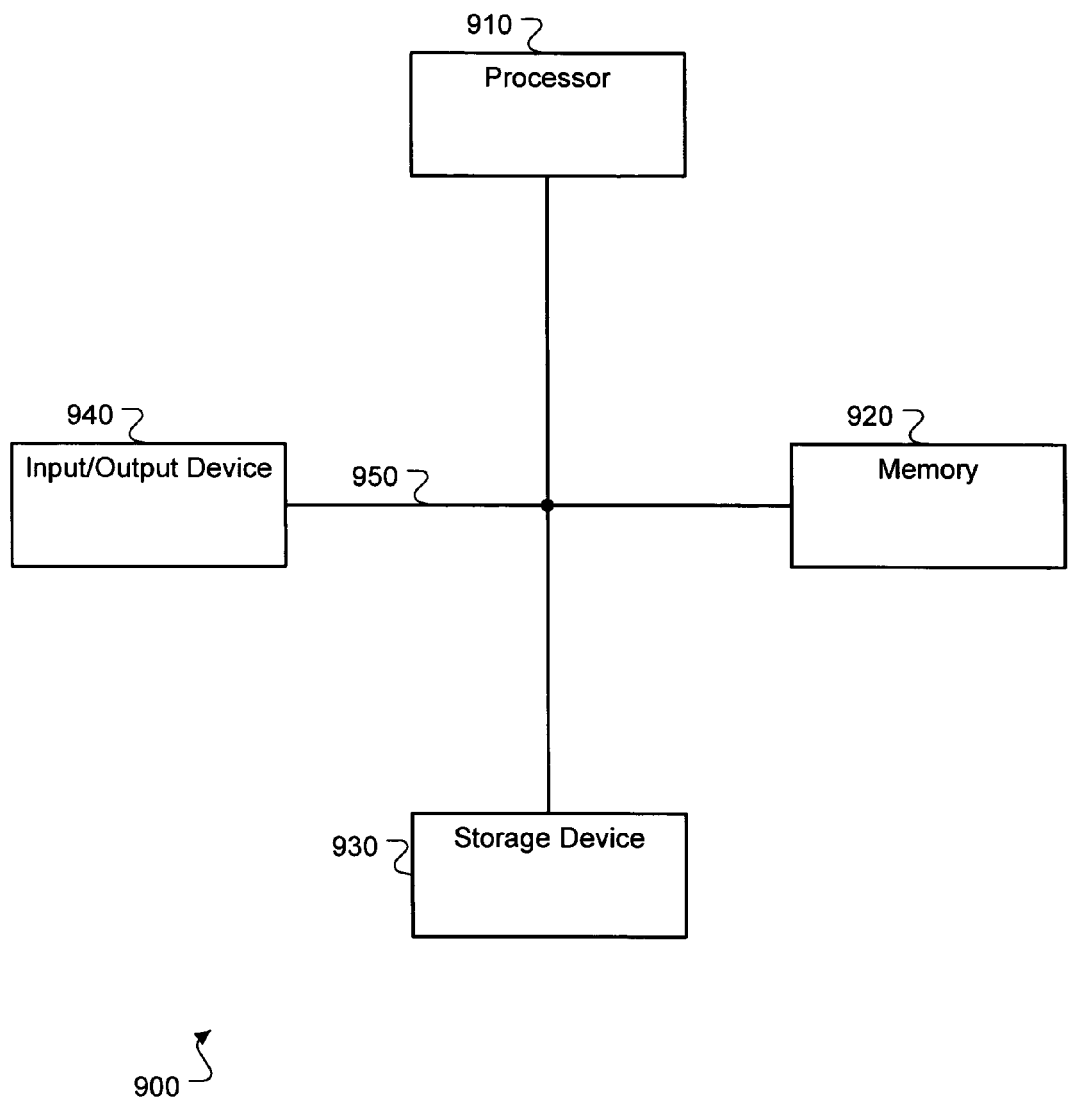
FIG. 8 shows a block diagram of a computer system.

FIG. 8 is a block diagram of a computer system 900 that can be used in the operations described above, according to one embodiment.

The system 900 includes a processor 910, a memory 920, a storage device 930, and an input/output device 940. Each of the components 910, 920, 930, and 940 are interconnected using a system bus 950. The processor 910 is capable of processing instructions for execution within the system 900. In one embodiment, the processor 910 is a single-threaded processor. In another embodiment, the processor 910 is a multi-threaded processor. The processor 910 is capable of processing instructions stored in the memory 920 or on the storage device 930 to display graphical information for a user interface on the input/output device 940.

The memory 920 stores information within the system 900. In one embodiment, the memory 920 is a computer-readable medium. In one embodiment, the memory 920 is a volatile memory unit. In another embodiment, the memory 920 is a non-volatile memory unit.

The storage device 930 is capable of providing mass storage for the system 900. In one embodiment, the storage device 930 is a computer-readable medium. In various different embodiments, the storage device 930 may be a floppy disk device, a hard disk device, an optical disk device, or a tape device.

The input/output device 940 provides input/output operations for the system 900. In one embodiment, the input/output device 940 includes a keyboard and/or pointing device. In one embodiment, the input/output device 940 includes a display unit for displaying graphical user interfaces.

The invention can be implemented in digital electronic circuitry, or in computer hardware, firmware, software, or in combinations of them. Apparatus of the invention can be implemented in a computer program product tangibly embodied in an information carrier, e.g., in a machine-readable storage device or in a propagated signal, for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the invention can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The invention can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of embodiments of the invention have been described. Nevertheless, it will be understood that various modifications may be made without departing from the spirit and scope of the invention. Accordingly, other embodiments are within the scope of the following claims.

What is claimed is:

1. A computer implemented method to be performed in a process of a computer system initiating physical operations, the method comprising:
    receiving, in a computer system, a request to generate a first object and a second object, the first object to be used in initiating a manufacturing-type operation and the second object to be used in initiating a warehouse-type operation;
    generating the first object and the second object in response to the request, the first and second objects being generated using an object model for physical operations; and
    generating an electronic view for at least one of the first and second objects, the electronic view being defined by the object model.

2. The method of claim 1, further comprising generating a step object for at least one of the first and second objects, the step object representing performance of a step in the associated operation.

3. The method of claim 1, further comprising aggregating the first and second objects into an operation object.

4. The method of claim 3, wherein the aggregation is done by assembling the first and second objects under a hierarchy node in the object model.

5. The method of claim 4, wherein the hierarchy node is selected from among several hierarchy nodes in the object model based on a type of the hierarchy node.

6. The method of claim 1, wherein the manufacturing-type operation is designed to transform a material of a product, and wherein the warehouse-type operation is (1) designed to physically move a product, or (2) designed to physically pack the product.

7. The method of claim 1, further comprising defining an input for at least one of the first and second objects, the input specifying a condition for initiating the associated operation.

8. The method of claim 1, further comprising defining an output for at least one of the first and second objects, the output specifying a result of performing the associated operation.

9. The method of claim 1, further comprising initiating the manufacturing-type operation using the first object, and initiating the warehouse-type operation using the second object.

10. The method of claim 1, wherein the electronic view represents a material flow regarding the manufacturing-type operation or the warehouse-type operation.

11. The method of claim 1, wherein the electronic view represents a scheduling regarding the manufacturing-type operation or the warehouse-type operation.

12. The method of claim 1, wherein the electronic view represents a description of the manufacturing-type operation or the warehouse-type operation.

13. A computer program product tangibly embodied in an information carrier, the computer program product including instructions that, when executed, cause a processor to perform operations comprising:
    receiving, in a computer system, a request to generate a first object and a second object, the first object to be used in initiating a manufacturing-type operation and the second object to be used in initiating a warehouse-type operation;
    generating the first object and the second object in response to the request, the first and second objects being generated using an object model for physical operations; and
    generating an electronic view for at least one of the first and second objects, the electronic view being defined by the object model.

14. A system comprising:
    a first resource configured to perform a manufacturing-type operation with regard to a product;
    a second resource configured to perform a warehouse-type operation with regard to the product; and
    an object generating module configured to generate a first object to be used in initiating the manufacturing-type operation and a second object to be used in initiating the warehouse-type operation, the first and second objects being generated using an object model for physical operations, and further configured to generate an electronic view for at least one of the first and second objects, the electronic view being defined by the object model.

15. The system of claim 14, wherein the object generating module is further configured to generate a step object for at least one of the first and second objects, the step object representing performance of a step in the associated operation.

16. The system of claim 14, wherein the electronic view represents a material flow regarding the manufacturing-type operation or the warehouse-type operation.

17. The system of claim 14, wherein the electronic view represents a scheduling regarding the manufacturing-type operation or the warehouse-type operation.

18. The system of claim 14, wherein the electronic view represents a description of the manufacturing-type operation or the warehouse-type operation.

* * * * *

UNITED STATES PATENT AND TRADEMARK OFFICE
CERTIFICATE OF CORRECTION

PATENT NO. : 7,603,260 B2  Page 1 of 1
APPLICATION NO. : 11/321198
DATED : October 13, 2009
INVENTOR(S) : Schmitz et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 827 days.

Signed and Sealed this

Fifth Day of October, 2010

David J. Kappos
*Director of the United States Patent and Trademark Office*